(12) United States Patent
Park

(10) Patent No.: US 11,387,908 B2
(45) Date of Patent: Jul. 12, 2022

(54) OPTICAL TRANSCEIVER

(71) Applicant: SOLiD, INC., Seongnam-si (KR)

(72) Inventor: Bum Soo Park, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/106,503

(22) Filed: Nov. 30, 2020

(65) Prior Publication Data

US 2021/0167860 A1    Jun. 3, 2021

(30) Foreign Application Priority Data

Nov. 29, 2019   (KR) .................. 10-2019-0157716
Nov. 27, 2020   (KR) .................. 10-2020-0163377

(51) Int. Cl.
| H04B 10/04 | (2006.01) |
| H04B 10/50 | (2013.01) |
| H04B 10/40 | (2013.01) |
| H04B 10/572 | (2013.01) |

(52) U.S. Cl.
CPC ......... *H04B 10/5053* (2013.01); *H04B 10/40* (2013.01); *H04B 10/506* (2013.01); *H04B 10/572* (2013.01)

(58) Field of Classification Search
CPC .. H04B 10/5053; H04B 10/40; H04B 10/506; H04B 10/572
USPC ....................................................... 398/183
See application file for complete search history.

(56) References Cited

U.S. PATENT DOCUMENTS

| 5,898,719 A | * | 4/1999 | Ryu ................. H01S 5/0687 372/32 |
| 6,441,933 B1 | * | 8/2002 | Jang ................. H04J 14/02 398/79 |
| 9,083,468 B2 | | 7/2015 | Zheng et al. |
| 2011/0229129 A1 | | 9/2011 | Hu et al. |
| 2013/0308951 A1 | * | 11/2013 | Blumenthal ......... G02B 6/4246 398/83 |

FOREIGN PATENT DOCUMENTS

| KR | 10-2008-0052332 A | | 6/2008 | |
| KR | 10-2009-0037195 A | | 4/2009 | |
| WO | WO 03/081812 | * | 10/2003 | ........... H04B 10/155 |

OTHER PUBLICATIONS

Extended European Search Report dated Apr. 21, 2021 from the European Patent Office in Application No. 20210647.

* cited by examiner

*Primary Examiner* — Mohammad R Sedighian
(74) *Attorney, Agent, or Firm* — Sughrue Mion, PLLC

(57) ABSTRACT

Provided is an optical transceiver including a reference tunable laser module configured to generate and output light of a reference wavelength; a first general tunable laser module configured to generate and output light of a first wavelength; and a controller configured to control a tuning operation of the first wavelength of the first general tunable laser module, based on information about a relationship between the reference wavelength and the first wavelength.

8 Claims, 5 Drawing Sheets

FIG. 5

| PORT | OUTPUT WAVELENGTH | TEMPERATURE |
|---|---|---|
| TUNABLE LASER MODULE 1 | $\lambda_1 = \lambda_n + a$ | $a = \alpha \Delta T + x_1$ |
| TUNABLE LASER MODULE 2 | $\lambda_2 = \lambda_n + b$ | $b = \alpha \Delta T + x_2$ |
| ... | ... | ... |
| TUNABLE LASER MODULE m | $\lambda_m = \lambda_n + k$ | $k = \alpha \Delta T + x_m$ | ced
OPTICAL TRANSCEIVER

CROSS-REFERENCE TO RELATED APPLICATION

This application claims the benefit of Korean Patent Application No. 10-2019-0157716, filed on Nov. 29, 2019, and Korean Patent Application No. 10-2020-0163377, filed on Nov. 27, 2020, in the Korean Intellectual Property Office, the disclosures of which are incorporated herein in its entirety by reference.

BACKGROUND

1. Field

The present disclosure relates to optical transceivers, and more particularly, variable-wavelength optical transceivers.

2. Description of the Related Art

Passive optical networks (hereinafter referred to as 'PON') have become the core of the implementation of FTTH environments and Giga-bit Ethernet.

In order to implement wavelength division multiplexing (WDM)-PON, a number of light sources with unique wavelengths are required. To implement multiple light sources with different wavelengths in the WDM-PON, in recent years, the use of a multiport-type variable-wavelength optical transceiver capable of simultaneously outputting a plurality of optical signals having different wavelengths is gradually increasing.

The above-described variable-wavelength optical transceiver includes a plurality of integrated tunable laser modules, wherein the integrated tunable laser modules generally have the same configuration and structure. For example, each of the tunable laser modules includes a wavelength locker, a current-to-voltage (I/V) converter, a thermistor, a thermoelectric cooler (TEC), and the like. However, the wavelength locker, the I/V converter, the thermistor, the TEC, and the like are not configurations for generating light of a wavelength required for the corresponding tunable laser module (i.e. clai, the allocated wavelength). Nevertheless, as the wavelength locker, the I/V converter, the thermistor, the TEC, and the like are all included in each tunable laser module, disadvantages arise in terms of manufacturing cost, design, and control complexity of the variable-wavelength optical transceiver.

SUMMARY

Provided are variable-wavelength optical transceivers capable of outputting light sources having multiple wavelengths while reducing manufacturing cost, design, and control complexity.

Additional aspects will be set forth in part in the description which follows and, in part, will be apparent from the description, or may be learned by practice of the presented embodiments.

According to an aspect of the present disclosure, there is provided an optical transceiver includes a reference tunable laser module configured to generate and output light of a reference wavelength; a first general tunable laser module configured to generate and output light of a first wavelength; and a controller configured to control a tuning operation of the first wavelength of the first general tunable laser module, based on information about a relationship between the reference wavelength and the first wavelength.

According to an exemplary embodiment, the information about the relationship between the reference wavelength and the first wavelength may be information indicating a difference between the reference wavelength and the first wavelength.

According to an exemplary embodiment, the difference between the reference wavelength and the first wavelength may be preset considering a correlation according to temperature between the reference wavelength and the first wavelength.

According to an exemplary embodiment, the optical transceiver may further include a memory configured to store a lookup table including the information about the relationship between the reference wavelength and the first wavelength.

According to an exemplary embodiment, the reference wavelength may be a wavelength for a channel for transmitting and receiving data or a wavelength for an auxiliary channel.

According to an exemplary embodiment, from among the reference tunable laser module and the first general tunable laser module, only the reference tunable laser module may include at least one of a wavelength locker, a current voltage converter, a thermoelectric cooler, and a temperature sensor.

According to an exemplary embodiment, the optical transceiver may further include a second general tunable laser module configured to generate and output light of a second wavelength, wherein the controller may control a tuning operation of the second wavelength of the second general tunable laser module, based on information about a relationship between the reference wavelength and the second wavelength According to another aspect of the present disclosure, there is provided an optical transceiver includes at least one tunable laser module; and a controller configured to control wavelength tuning of the at least one tunable laser module by referring to a lookup table including information about a relationship between a preset reference wavelength and an output wavelength allocated to the at least one tunable laser module.

According to an exemplary embodiment, the relationship information may be information indicating a difference between the preset reference wavelength and the allocated output wavelength.

According to an exemplary embodiment, the difference between the preset reference wavelength and the allocated output wavelength may be determined in advance considering a correlation according to temperature between the preset reference wavelength and the allocated output wavelength.

According to an exemplary embodiment, the preset reference wavelength may be a wavelength for a channel for transmitting and receiving data or a wavelength for an auxiliary channel.

According to an exemplary embodiment, the optical transceiver may further include a reference tunable laser module configured to generate and output light of the preset reference wavelength, wherein only the reference tunable laser module may include at least one of a wavelength locker, a current voltage converter, a thermoelectric cooler, and a temperature sensor.

According to embodiments, in implementing a variable-wavelength optical transceiver capable of outputting light sources having a plurality of wavelengths by integrating a plurality of tunable laser modules, there is an effect of reducing manufacturing cost, design, and control complexity by simplifying parts of some tunable laser modules.

Effects obtainable by the embodiments of the disclosure are not limited to the effects described above, and other effects not described herein may be clearly understood by one of ordinary skill in the art to which the inventive concept belongs from the following description.

BRIEF DESCRIPTION OF THE DRAWINGS

Embodiments of the disclosure will be more clearly understood from the following detailed description taken in conjunction with the accompanying drawings in which:

FIG. 5 is an exemplary diagram of a wavelength lookup table according to an embodiment.

DETAILED DESCRIPTION

Figure 1:
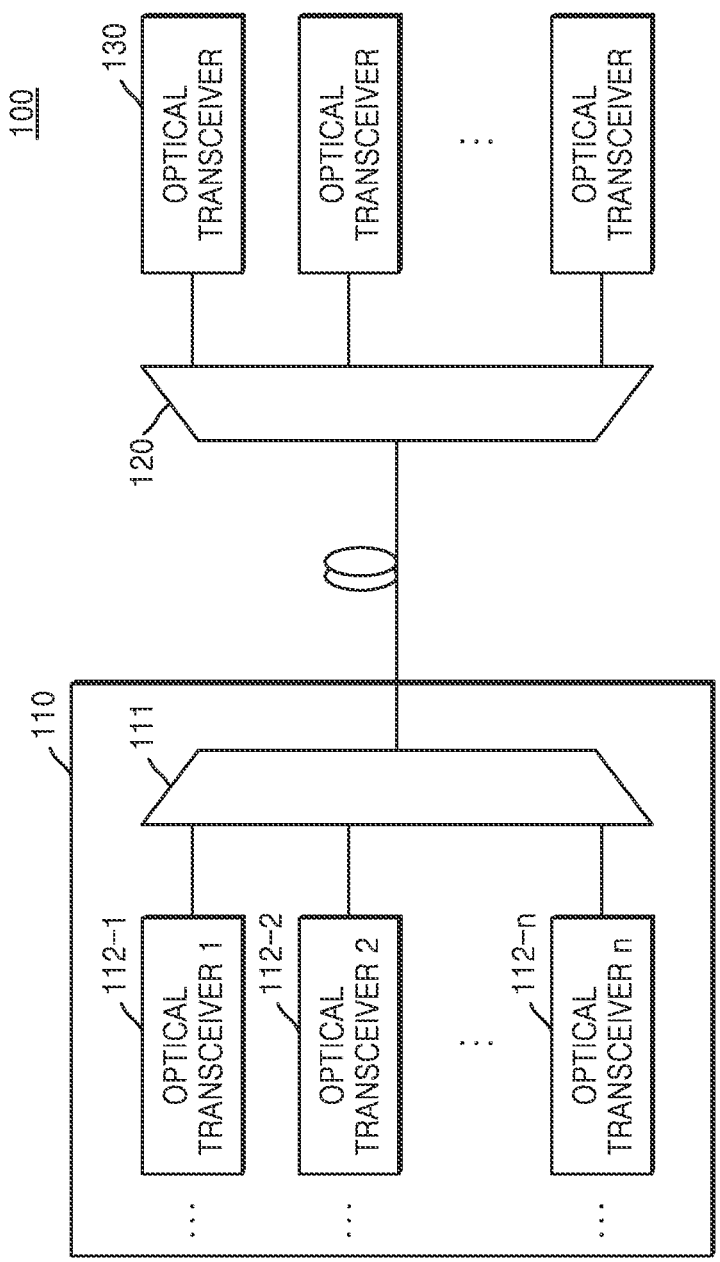
FIG. 1 is a configuration diagram of an optical communication system according to an embodiment.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component "is connected to" or "accesses" the other component, it is understood that the one component may be directly connected to or may directly access the other component but unless explicitly described to the contrary, another component may "be connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

Hereinafter, various embodiments of the disclosure will be described in detail in order.

FIG. 1 is a configuration diagram of an optical communication system according to an embodiment.

Referring to FIG. 1, an optical communication system 100 according to an embodiment may include an optical communication device 110, a demultiplexer (DeMUX) 120 for receiving an optical signal transmitted from an optical communication device 110, and remote optical transceivers 130 connected to the DeMUX 120 to receive separate optical signals.

The optical communication device 110 may include n optical transceivers 112-1 to 112-n (where n is a natural number of 2 or more) for generating individual optical signals and a multiplexer (MUX) 111 for multiplexing n optical signals input from the n optical transceivers 112-1 to 112-n. According to an embodiment, the MUX 111 may be separated from the optical communication device 110.

The optical communication device 110 may convert input data or data received from another device into an optical signal and transmit the optical signal to the DeMUX 120. In addition, the DeMUX 120 is a device connected to the optical communication device 110 through an optical cable, and transmits allocated individual optical signals to the corresponding remote optical transceivers 130, respectively. The remote optical transceivers 130 are connected to a certain device.

In some embodiments, the optical communication system 100 may be applied to an optical subscriber network. In this case, the optical communication device 110 may be an optical line terminal (OLT) at a central office side. The remote optical transceivers 130 may be connected to any one of a remote terminal (RT), an optical network terminal (ONT) at a subscriber side, and an optical network unit.

In another embodiment, the optical communication system 100 may constitute an optical transport network, which is a sub-network constituting a fronthaul segment of a radio access network architecture. In this case, the optical communication device 110 may be a digital unit (DU) at the central office side or a termination device at a baseband unit (BBU) side. In addition, the remote optical transceivers 130 may be connected to remote units (RU) or remote radio heads (RRH). However, the disclosure is not limited thereto, and the inventive concept may be applied to a midhaul and a backhaul segment of the radio access network architecture.

In another embodiment, the optical communication system 100 may be applied to a distributed antenna system (DAS) for solving a shadow area of a base station. In this case, the optical communication device 110 may be a headend unit, and the remote optical transceivers 130 may be connected to an extension unit or a remote unit.

As described above, the optical communication system 100 according to the inventive concept may be applied to various optical communication networks implemented by optical communication devices that are located remotely from each other and transmit and receive optical signals through corresponding optical transceivers.

Hereinafter, a detailed operation of an optical transceiver 112 from among components of the optical communication device 110 will be described with reference to FIG. 5.

Figure 2:
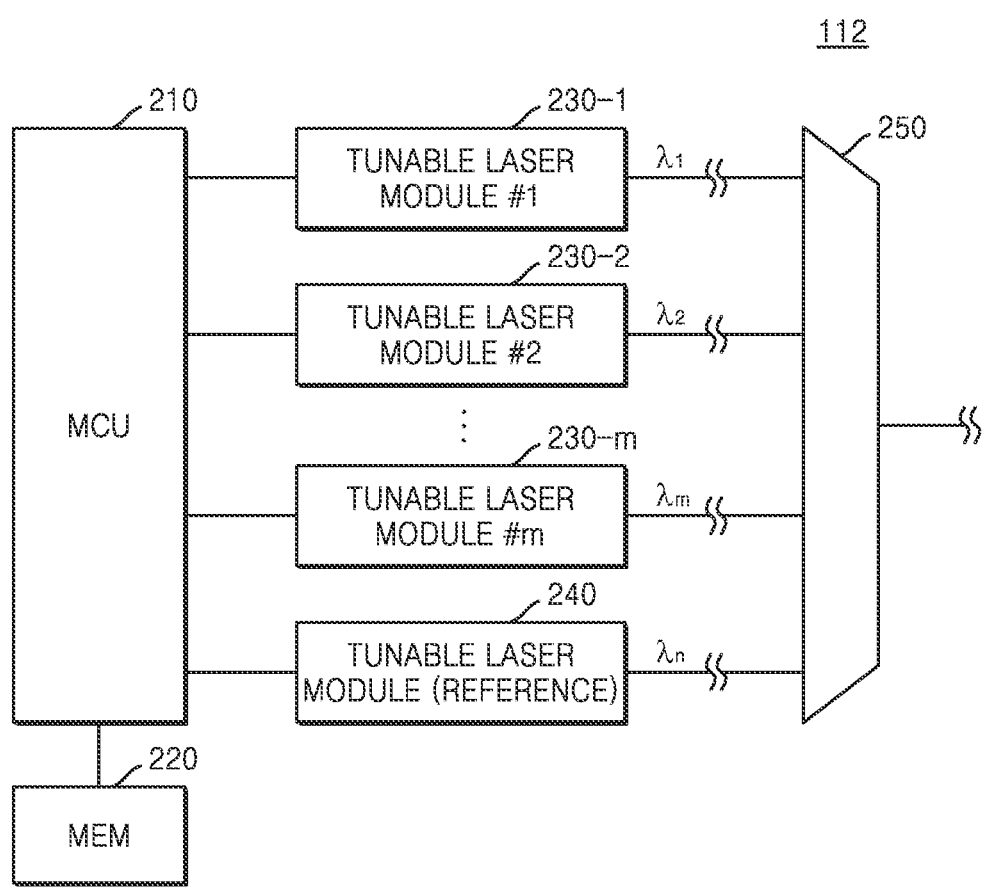
FIG. 2 is a block diagram of an optical transceiver according to an embodiment.
Figure 3:
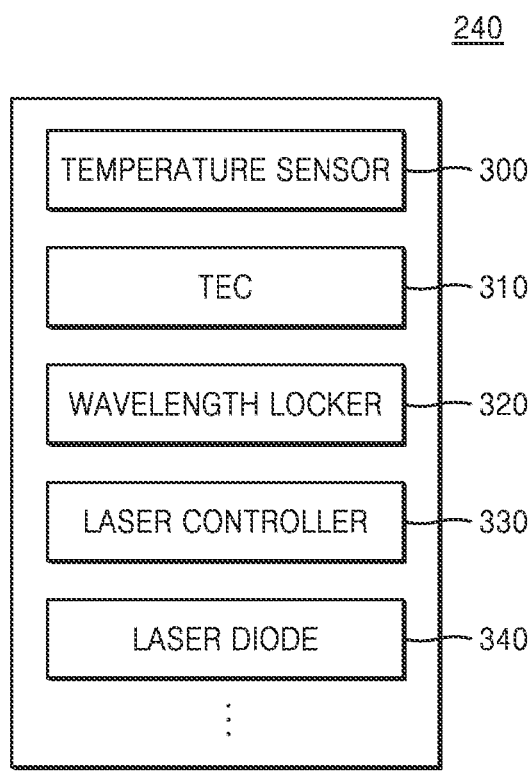
FIG. 3 is a block diagram of a reference tunable laser module according to an embodiment.
Figure 4:
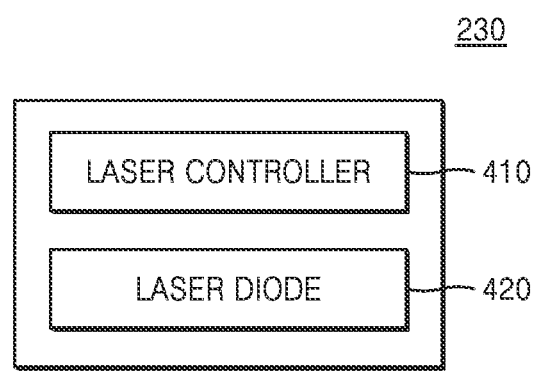
FIG. 4 is a block diagram of a general tunable laser module according to an embodiment.

FIG. 2 is a block diagram of the optical transceiver 112 according to an embodiment, FIG. 3 is a block diagram of a reference tunable laser module according to an embodiment, FIG. 4 is a block diagram of a general tunable laser module 230 according to an embodiment, and FIG. 5 is an exemplary diagram of a wavelength lookup table according to an embodiment.

Referring to FIGS. 2 to 4, the optical transceiver 112 according to an embodiment may include a controller (main control unit (MCU)) 210, a memory 220, in general tunable laser modules 230-1 and 230-2 to 230-$m$ (where m is a natural number of 3 or more), and a reference tunable laser module 240. Depending on the implementation, the optical transceiver 112 may further include a MUX 250.

First, the reference tunable laser module 240 and the general tunable laser module 230 will be described.

The reference tunable laser module 240 according to an embodiment may include a temperature sensor 300, a thermoelectric cooler (TEC) 310, a wavelength locker 320, a laser controller 330, and a laser diode 340. In addition, although not shown, the reference tunable laser module 240 may further include a current-to-voltage (I/V) converter capable of converting a current signal into a voltage signal corresponding thereto, a thermistor in which a resistance value changes according to temperature, and the like.

The general tunable laser modules 230-1 to 230-$m$ according to an embodiment may include a laser controller 410 and a laser diode 420. It can be seen that the general tunable laser module 230 does not include a TEC, a wavelength locker, an I/V converter, a thermistor, etc. unlike the reference tunable laser module 240.

The reference tunable laser module 240 may output an optical signal having a preset $n^{th}$ wavelength $\lambda n$. Hereinafter, the $n^{th}$ wavelength $\lambda n$ is referred to as a reference wavelength. The reference wavelength may be set in advance, and according to embodiments, a wavelength for a data transmission/reception channel or a wavelength for an auxiliary channel (wavelength for wavelength locking, etc.) may be set as the reference wavelength. Because the operation of the reference tunable laser module 240 is substantially the same as the operation of the conventional tunable laser module, a detailed description thereof will not be given herein.

The first general tunable laser module 230-1 may output an optical signal having a first wavelength $\lambda 1$ under control of the controller 210. In addition, the second general tunable laser module 230-2 may output an optical signal having a second wavelength $\lambda 2$ under control of the controller 210. In addition, the $m^{th}$ general tunable laser module 230-$m$ may output an optical signal having an $m^{th}$ wavelength $\lambda m$ under control of the controller 210. The first wavelength $\mu 1$, the second wavelength $\lambda 2$ to the $m^{th}$ wavelength $\lambda m$, and the reference wavelength $\lambda n$ may all be different wavelengths.

In more detail, operations in which the controller 210 controls the optical signal output, based on a relationship between the preset reference wavelength $\lambda n$ and an allocated wavelength required for each of the m individual general tunable laser modules 230-1 to 230-$m$, will be described.

First, information about the reference wavelength $\lambda n$ may be stored in the memory 220, and information about a relationship between the reference wavelength $\lambda n$ and each of the first wavelength to the $m^{th}$ wavelength $\lambda 1$ to $\lambda m$ is stored in the form of a lookup table. In FIG. 2, the memory 220 is shown to be a separate component from the controller 210, but the memory 220 may be included in the controller 210.

The controller 210 may control the laser controller 410 included in the first general tunable laser module 230-1 based on the information about the relationship between the reference wavelength $\lambda n$ and the first wavelength $\lambda 1$ stored in the lookup table of the memory 220, and the laser controller 410 may cause the laser diode 420 to output a first optical signal corresponding to the first wavelength $\lambda 1$.

In the same way, the controller 210 may control the laser controller 410 included in the mil general tunable laser module 230-$m$ based on the information about the relationship between the reference wavelength $\lambda n$ and the $m^{th}$ wavelength $\lambda m$ stored in the lookup table, and the laser controller 410 may cause the laser diode 420 to output an $m^{th}$ optical signal corresponding to the $m^{th}$ wavelength $\lambda m$.

FIG. 5 illustrates a wavelength lookup table according to an embodiment of the disclosure. The wavelength lookup table may include information about a relationship between the first wavelength $\lambda 1$ and the reference wavelength $\lambda n$, information about a relationship between the second wavelength $\lambda 2$ and the reference wavelength $\lambda n$, and information about a relationship between the $m^{th}$ wavelength $\lambda m$ and the reference wavelength $\lambda n$.

The information about the respective relationships between the wavelengths and a reference wavelength may be information indicating a difference between the wavelengths. For example, as shown in FIG. 5, information indicating that the first wavelength is greater than the reference wavelength by a ($\lambda 1 = \lambda n + a$), the second wavelength is greater than the reference wavelength by b ($\lambda 2 = \lambda n + b$), and the $m^{th}$ wavelength is greater than the reference wavelength by k ($\lambda m = \lambda n + k$) may be included in the lookup table.

The difference (a, b, etc.) between the wavelengths may be, for example, a value preset considering a correlation according to temperature, and the wavelength lookup table may also include information related to the temperature. For example, in the wavelength lookup table, $a = \alpha \Delta T + x1$, $b = \alpha \Delta T + x2$, and $k = \alpha \Delta T + xm$ may be preset. Where $\alpha$ may be a preset correlation coefficient. Also, $\Delta T$ may be a difference value from a preset reference temperature. Information about the reference temperature may be stored in advance in the memory 220, the reference tunable laser module 240 may sense the current temperature through the provided temperature sensor 300, and the controller 210 may generate the difference value $\Delta T$ between the sensed temperature and the reference temperature. In addition, x1 to xm may be preset offsets. Information related to such temperature may also be included in the wavelength lookup table and stored in the memory 220 in advance.

Accordingly, the controller 210 may read information, which is stored in the memory 220, about a relationship between a reference wavelength and a wavelength required for general tunable laser modules by referring to the wavelength lookup table, and may control wavelength tuning of an optical signal to have a wavelength required for each of the first general tunable laser module 230-1 to the $m^{th}$ general tunable laser module 230-$m$ based on the read information.

In other words, the controller 210 may control the laser controller 410 of each of the general tunable laser modules, and each laser controller 410 may se an output light wavelength value of a general laser diode to have an output light wavelength value that is set (or allocated) according to the control of the controller 210.

The $n^{th}$ optical signal output from the reference tunable laser module 240 may be combined with transmission data in a corresponding modulator, converted into modulated $n^{th}$ optical data, and input to the MUX 250.

Likewise, each of the first optical signal to the $m^{th}$ optical signal respectively output from the first general tunable laser module 230-1 to the $m^{th}$ general tunable laser module 230-$m$ may be combined with transmission data in a corresponding modulator and converted into modulated first to m$^{th}$ optical data, and each of the first to m$^{th}$ optical data may be input to the MUX 250.

The MUX 250 of the optical transceiver 112 may multiplex the first optical data to the n$^{th}$ optical data and output them to the MUX 111 of the optical communication device 110. The MUX 111 of the optical communication device 110 may multiplex optical signals input from the plurality of optical transceivers 112-1 to 112-n and transmit the multiplexed optical signals to the corresponding remote optical transceivers 130 with the DeMUX 120 therebetween through an optical cable.

As described above, the controller 210 may set a wavelength value of an optical signal output from the general tunable laser modules 230-1 to 230-m using a wavelength lookup table stored in the memory 220.

Therefore, each of the plurality of general tunable laser modules 230-1 to 230-m may not include other components (e.g., TEC, wavelength locker, thermistor, etc.) other than the laser controller 410 and the laser diode 420 for generating an optical signal.

Accordingly, it is obvious that the optical transceiver according to the embodiments may simplify the configuration and further reduce the manufacturing cost.

In the above description, it is assumed that the reference tunable laser module 240 outputs an optical signal having a preset reference wavelength. However, the reference tunable laser module 240 may also generate and output light of a corresponding wavelength under the control of the controller 210.

For example, the wavelength lookup table of the memory 220 may include information about a relationship between a reference wavelength and a wavelength to be output from the reference tunable laser module 240 (i.e., the n$^{th}$ wavelength). In this case, the controller 210 may perform tuning for the reference wavelength using information stored in the wavelength lookup table of the memory 220. That is, the controller 210 may control the laser controller 330, and the laser controller 330 may set an output light wavelength value of the reference laser diode 340 under the control of the controller 210.

Hereinabove, the disclosure has been described with reference to the preferred embodiments. However, it will be appreciated by those skilled in the art that various modifications and changes of the disclosure can be made without departing from the spirit and the scope of the inventive concept that are defined in the appended claims and their equivalents.

The invention claimed is:

1. An optical transceiver comprising:
 a reference tunable laser module configured to generate and output light of a reference wavelength;
 a first general tunable laser module configured to generate and output light of a first wavelength; and
 a controller configured to control a tuning operation of the first wavelength of the first general tunable laser module, based on information about a relationship between the reference wavelength and the first wavelength,
 wherein the information about the relationship between the reference wavelength and the first wavelength is information indicating a difference between the reference wavelength and the first wavelength, and
 wherein the difference between the reference wavelength and the first wavelength is preset considering a correlation according to temperature between the reference wavelength and the first wavelength.

2. The optical transceiver of claim 1, further comprising:
 a memory configured to store a lookup table including the information about the relationship between the reference wavelength and the first wavelength.

3. The optical transceiver of claim 1, wherein the reference wavelength is a wavelength for a channel for transmitting and receiving data or a wavelength for an auxiliary channel.

4. The optical transceiver of claim 1, further comprising:
 a second general tunable laser module configured to generate and output light of a second wavelength,
 wherein the controller controls a tuning operation of the second wavelength of the second general tunable laser module, based on information about a relationship between the reference wavelength and the second wavelength.

5. The optical transceiver of claim 1, wherein the reference tunable laser module includes at least one of a wavelength locker, a current voltage converter, a thermoelectric cooler, and a temperature sensor, and the first general tunable laser module does not include the wavelength locker, the current voltage converter, the thermoelectric cooler, or the temperature sensor.

6. An optical transceiver comprising:
 at least one tunable laser module;
 a reference tunable laser module configured to generate and output light of a preset reference wavelength; and
 a controller configured to control wavelength tuning of the at least one tunable laser module by referring to a lookup table including information about a relationship between the preset reference wavelength and an output wavelength allocated to the at least one tunable laser module,
 wherein the information about the relationship between the reference wavelength and the first wavelength is information indicating a difference between the reference wavelength and the first wavelength, and
 wherein the difference between the reference wavelength and the first wavelength is preset considering a correlation according to temperature between the reference wavelength and the first wavelength.

7. The optical transceiver of claim 6, wherein the preset reference wavelength is a wavelength for a channel for transmitting and receiving data or a wavelength for an auxiliary channel.

8. The optical transceiver of claim 6, wherein the reference tunable laser module includes at least one of a wavelength locker, a current voltage converter, a thermoelectric cooler, and a temperature sensor, and the at least one tunable laser module does not include the wavelength locker, the current voltage converter, the thermoelectric cooler, or the temperature sensor.

* * * * *